Dec. 20, 1955 H. G. PASCALAR 2,727,986

MICROWAVE BALANCED CRYSTAL MIXER

Filed Nov. 24, 1954

INVENTOR.

Herbert G. Pascalar

BY

Charles H. Brown

ATTORNEY

United States Patent Office 2,727,986

Patented Dec. 20, 1955

2,727,986

MICROWAVE BALANCED CRYSTAL MIXER

Herbert G. Pascalar, Bedford, Mass., assignor to Radio Corporation of America, a corporation of Delaware Application November 24, 1954, Serial No. 470,852

7 Claims. (Cl. 250—20)

This invention relates to microwave balanced crystal mixers of the type having one waveguide input and one coaxial line input.

Microwave balanced crystal mixers are useful in, inter-alia, radar and radio receivers for mixing a received radio frequency wave with the output of a local oscillator to produce an intermediate frequency signal. Chapter 6 of "Microwave Mixers" by Robert V. Pound, McGraw-Hill, 1948, sets forth the advantages of balanced crystal mixers and describes constructions including wave-guide magic T junctions and hybrid rings.

It is an object of this invention to provide an improved balanced crystal mixer which is constructed entirely within a waveguide carrying the radio frequency signal.

It is another object to provide an improved balanced crystal mixer including means to prevent radio frequency and local oscillator signals from appearing on the intermediate frequency output leads.

It is a further object to provide an improved balanced crystal mixer wherein impedance matching between the input signal and the crystals, and between the local oscillator signal and the crystals, is conveniently and independently accomplished.

It is a further object to provide an improved balanced crystal mixer construction which is relatively simple and inexpensive to manufacture.

In one aspect, the invention comprises a rectangular waveguide thru which the radio frequency signal is propagated, and a coaxial line cross mounted within the waveguide with two in-line arms extending thru the narrow sidewalls of the waveguide, and with two additional in-line arms extending to points spaced from the respective broad sidewalls of the waveguide. The inner conductors of the latter two arms are each connected to one terminal of a crystal diode, the other terminal of each diode being connected to the respective broad sidewall of the waveguide. The waveguide is provided with an end wall at a distance from the coaxial line cross which optimizes a coupling of signal energy in the waveguide to the crystal diodes. The output of a local oscillator is applied thru one of the first mentioned in-line coaxial line arms. The inner and outer conductors of the other of the first mentioned in-line arms are shorted at a distance from the center of the coaxial line cross which optimizes the transfer of energy from the local oscillator to the crystal diodes. The intermediate frequency output is taken from the diodes on two parallel wire lines. The connections to the diodes are arranged so that filters or radio frequency chokes prevent the input signal frequencies from appearing on the intermediate frequency output leads.

Figure 1:
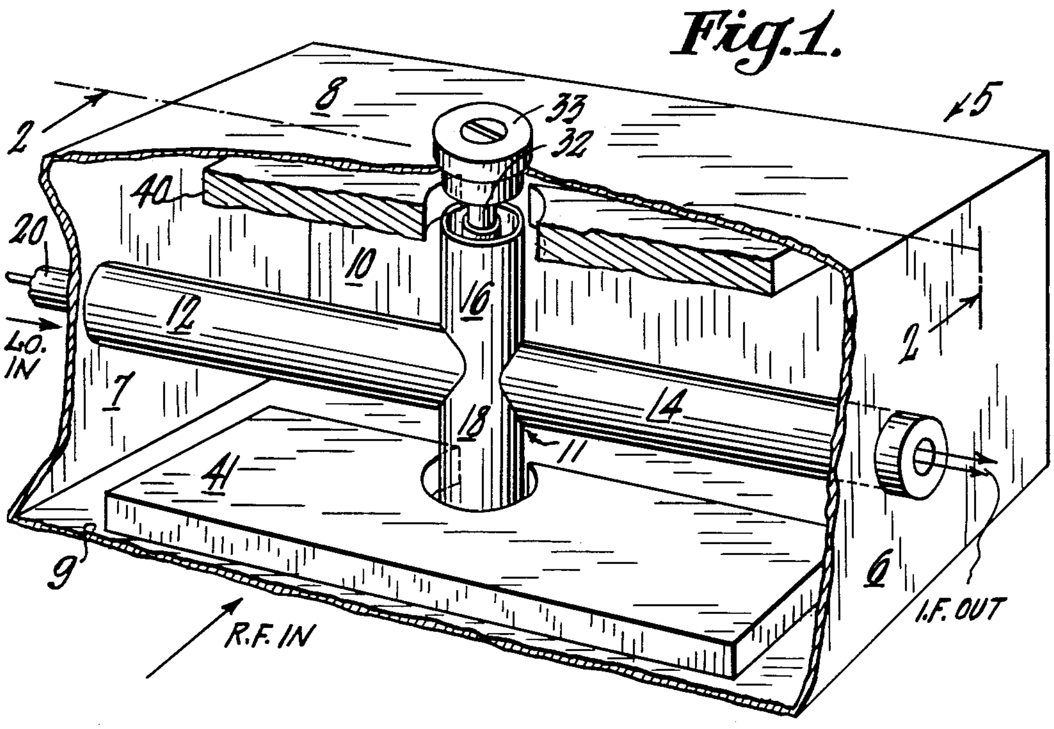
Figure 2:
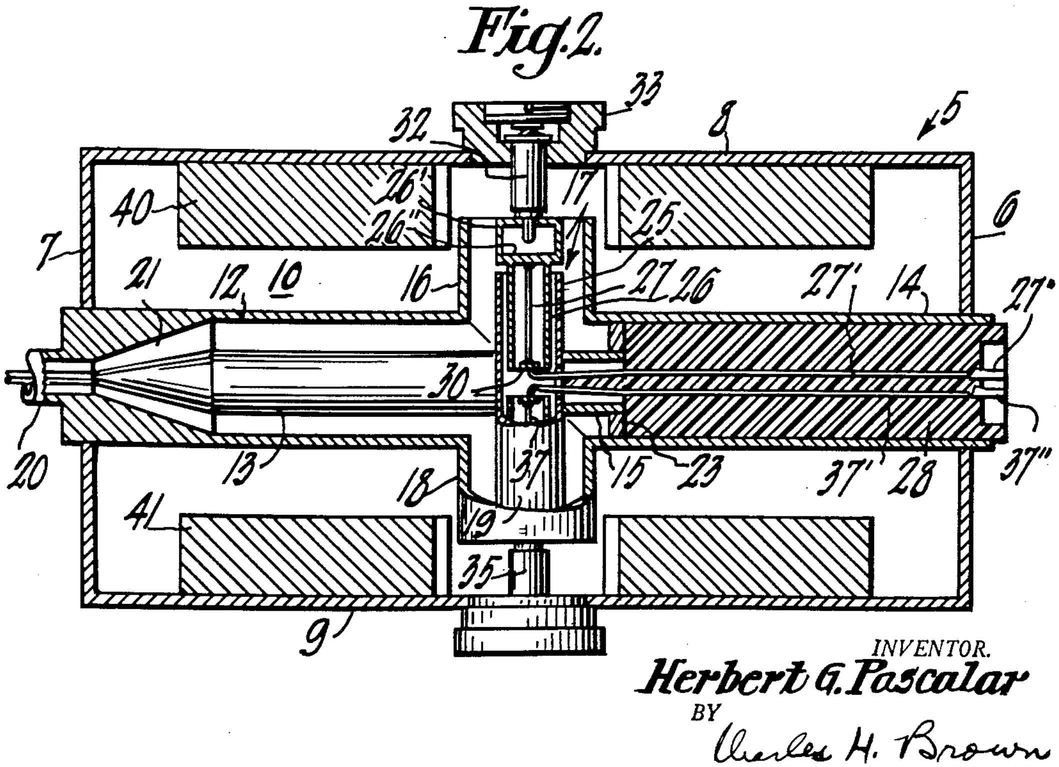

These and other objects and aspects of the invention will be apparent to those skilled in the art from the following more detailed description taken in conjunction with the appended drawings, wherein:

Figure 1 is a perspective view of a presently preferred form of the invention with portions cut away to reveal interior details; and Figure 2 is a sectional view taken on the line 2—2 of Figure 1.

Referring now to Figures 1 and 2 for a more detailed description of a balanced crystal mixer constructed according to this invention, a rectangular waveguide generally designated 5 has narrow sidewalls 6 and 7, broad sidewalls 8 and 9, and an end wall 10. A coaxial line cross, generally designated 11, is centrally mounted within the waveguide 5. The coaxial line cross has a first arm including an outer conductor 12 and an inner conductor 13; a second arm having an outer conductor 14 and an inner conductor 15; a third arm having an outer conductor 16 and an inner conductor 17; and a fourth arm having an outer conductor 18 and an inner conductor 19. The first and second arms are in line with each other and extend thru the narrow sidewalls 7 and 6, respectively, of the waveguide. The arms including outer conductors 12 and 14 are disposed at right angles with the electric field vector of radio frequency energy propagated down the waveguide 5, and also at right angles with the direction of propagation which is toward the closed end 10 of the waveguide 5. A local oscillator signal is applied to the first arm 12, 13 thru a standard 50 ohm coaxial line 20 and a tapered coaxial line section 21. The electrical length of the coaxial line arm 14, 15 is determined by a conductive shorting washer 23 which electrically connects the inner conductor 15 with the outer conductor 14 at a distance from the center point of the cross which provides a proper impedance match to the local oscillator energy applied thru arm 12, 13.

The inner conductor 17 of the third coaxial arm 16, 17 includes three coaxial conductive members 25, 26 and 27. The outer diameter of both the member 25 and the upper portion 26′ of the member 26 is the same as the outer diameter of the inner conductor 13 in the arm 12, 13. The intermediate member 26 is cup-shaped by virtue of the closed end 26″. The third member 27 is a lead or wire connected at one end to the end 26″ of member 26, and extending to a capacitor plate 30 at the other end of member 26. From the plate 30, the lead 27 is continued as lead 27′ thru the hollow interior of the coaxial line arm 14, 15 to the output terminal 27″. The conductor 27′ is fixed in position by insulating material 28, which may for example be Teflon. The members 25, 26 and 27 are similarly maintained in fixed spaced relation by means of sleeves and washers (not shown) of insulating material such as Teflon. The insulating sleeves and washers have been omitted from the drawing in the interest of clarity of illustration.

The upper end 26′ of member 26 includes spring finbers for tightly engaging one terminal of a crystal diode or nonlinear impedance element 32. The other terminal of the crystal diode 32 is electrically and mechanically engaged by a socket 33 mounted in the broad sidewall 8 of the waveguide 5.

The construction of the arm 18, 19 is exactly the same as the arm 16, 17. A crystal diode 35 is mounted between the inner conductor 19 and the adjacent wide sidewall 9 of the waveguide 5. An output conductor 37, 37′ connects in a similar manner to the output terminal 37″.

Metallic impedance matching ridges 40 and 41 are mounted on the inner surfaces of the broader sidewalls 8 and 9, respectively, of the waveguide 5. The impedance matching ridges are cut out in the vicinity of the crystal diodes 32 and 35. The ridges 40 and 41 are substantially a quarter-wavelength in dimension in the direction of propagation of radio frequency energy in the waveguide, and the ridges are positioned at a point in the waveguide to provide proper impedance transforming action between the waveguide and the crystal diodes 32 and 35.

In the operation of the microwave balanced crystal mixer of this invention, radio frequency signal energy is propagated down the waveguide toward the coaxial line cross and the end wall 10 of the waveguide 5. The electric field vectors of this input energy extend between the broad sidewalls 8 and 9 so that the energy is divided in the waveguide by the outer conductors 12 and 14. Half of the energy is impressed across the crystal diode 32, and the other half is impressed across the crystal diode 35. The arrangement is such that the input radio frequency energy is impressed across the diodes in series.

Local oscillator signal energy is applied thru coaxial line 20 to the arm 12, 13 of the coaxial line cross. This energy passes to the center junction point in the coaxial line cross and divides, half of the energy going up the arm 16, 17 to the crystal diode 32, and the other half of the energy going down the arm 18, 19 to the crystal diode 35. It is thus apparent that the local oscillator signal is applied to the diodes 32 and 35 in parallel.

The intermediate frequency output signal is obtained from the diode 32 over lead 27, 27′, and terminal 27″; and the intermediate frequency output signal from the diode 35 is applied over lead 37, 37′ to the output lead 37″.

The output leads 27′ and 37′ are electrically insulated from each other, and at the same time radio frequency energy at the input signal and local oscillator frequencies is prevented from appearing on the output leads by reason of the radio frequency choke or filter construction employed for the inner conductors 17 and 19. Radio frequency energy can be propagated from the opening between the crystal terminal socket 26′ and the adjacent end of sleeve 25, down thru a coaxial line formed by open-ended sleeve member 26 and member 25, and back up thru a coaxial line formed by member 26 and lead 27. It should be noted that the end of member 26 adjacent to disc 30 is open. The total length of this path is a half-wavelength electrically at the input signal and local oscillator frequencies. Since the end of the path terminating at 26″ is short-circuited, a short-circuit is reflected back at the opening between the member 25 and the portion 26′ of member 26. Therefore, so far as the input radio frequency signal and the local oscillator frequencies are concerned, the members 25 and 26 are electrically short-circuited to prevent the coupling of radio frequency energy on to the lead 27. A metallic capacitor disc 30 may be employed to add capacitance so as to increase the electrical length of the path when the physical space available is not otherwise sufficient to provide a full half-wavelength path. In an exactly similar manner, radio frequency energy is prevented from appearing on the other output line 37′.

By way of example, the input radio frequency signal energy applied to the waveguide 5 may have a frequency in the order of 1250 megacycles, and the local oscillator frequency may be 1220 megacycles to provide an intermediate frequency of 30 megacycles. The difference between 1250 megacycles and 1220 megacycles is small percentage-wise so that the folded half-wavelength chokes in the inner conductors 17 and 19 are for practical purposes equally effective in preventing the two frequencies from reaching the output leads 27′ and 37′.

In the construction of a microwave balanced crystal mixer according to this invention, the outer conductors 12, 14, 16, 18 of the coaxial line cross are dimensioned to cause the cross to act as a low Q resonant iris in the waveguide 5. The position of the end wall 10 behind the coaxial line cross is chosen to form a very low Q resonant cavity which terminates the waveguide. The height of the transformer ridges 40 and 41, and the diameter of the openings therein are adjusted to the values providing the desired impedance transformation between the waveguide input and the crystal diodes.

Optimum power transfer from the local oscillator input to the crystal diodes is adjusted by means of adjusting the position of the shorting washer 23 between the outer conductor 14 and inner conductor 15 of the second arm in the coaxial line cross. It is apparent that according to this invention the adjustments for optimum transfer of energy from the waveguide to the crystals and from the local oscillator input to the crystals are entirely independent of each other. Since the adjustments are independent of each other and do not interact one upon the other, improved operating performance can readily be obtained.

By applicant's construction wherein radio frequency rejection filters or chokes are employed, radio frequency is prevented from appearing on the intermediate frequency output leads and it is therefore unnecessary to employ a balanced intermediate frequency output transformer to isolate the input radio frequency energy from the output prior to application of the signal to an intermediate frequency amplifier.

Applicant's construction is further advantageous in that the output leads 27′ and 37′ are carried out from the waveguide thru the interior of outer conductor 14 in such a manner that the output leads are completely isolated or shielded from the radio frequency signal carried by the waveguide and the local oscillator frequencies.

What is claimed is:

1. A balanced crystal mixer comprising, a rectangular waveguide thru which a first radio frequency wave is propagated, a coaxial line cross centrally mounted in said waveguide with first and second in-line arms extending thru the narrow side walls of said waveguide and with third and fourth in-line arms extending to points spaced from the wide sidewalls of said waveguide, means to apply a second radio frequency wave to said first arm, a shorting member between the inner and outer conductors of said second arm, non-linear impedance elements coupled between the inner conductors of said third and fourth arms and the respective wide sidewalls of said waveguide, and output leads extending from said non-linear elements to the exterior of said waveguide thru said second arm.

2. A mixer as defined in claim 1 wherein said output leads are carried thru the hollow interiors of the inner conductors of the second, third and fourth arms.

3. A mixer as defined in claim 2 wherein the inner conductors of said third and fourth arms are constructed to constitute radio frequency chokes at the frequencies propagated thru the rectangular waveguide and thru the first coaxial line arm.

4. A mixer as defined in claim 3, and in addition, conductive ridges connected to the wide sidewalls of said waveguide in the vicinity of said coaxial line cross to provide an impedance match between the waveguide and the non-linear elements.

5. A balanced crystal mixer comprising, a rectangular waveguide thru which a first radio frequency wave is propagated, a coaxial line cross centrally mounted in said waveguide with first and second in-line arms extending thru the narrow sidewalls of said waveguide and with third and fourth in-line arms extending to oppositely disposed points spaced from the wide sidewalls of said waveguide, non-linear impedance elements coupled between the inner conductors of said third and fourth arms and the respective wide sidewalls of said waveguide, means to apply a second radio frequency wave to said first arm, a shorting member between the inner and outer conductors of said second arm at a point which optimizes the energy transfer from said first arm to said non-linear impedance elements, and a conductive end wall on said wave-guide at a distance from said coaxial line cross which optimizes the transfer of energy from said waveguide to said non-linear impedance elements.

6. A balanced mixer as defined in claim 5, including output leads extending from said non-linear impedance elements thru said third and fourth arms and out thru said second arm.

7. A balanced crystal mixer comprising, a rectangular waveguide thru which a first radio frequency wave is propagated, a coaxial line cross centrally mounted in said waveguide with first and second coaxial in-line arms extending thru the narrow sidewalls of said waveguide and with third and fourth coaxial in-line arms extending to oppositely disposed points spaced from the wide sidewalls of said waveguide, means to apply a second radio frequency wave to said first arm, a shorting member between the inner and outer conductors of said second arm, said third and fourth coaxial arms each including a hollow inner conductor, a cup-shaped conductive member mounted in insulated relation within each said inner conductor of said third and fourth arms, a non-linear impedance device connected between the closed end of said cup-shaped member and the respective wide sidewall of said waveguide, and output leads respectively connected from the closed ends of the cup-shaped members coaxially thru said member and out thru said second coaxial arm.

References Cited in the file of this patent

UNITED STATES PATENTS 2,576,481 Rodwin ---------------- Nov. 27, 1951